United States Patent
Ji et al.

(10) Patent No.: US 9,084,183 B2
(45) Date of Patent: Jul. 14, 2015

(54) ROBUST FREQUENCY SCAN IN PRESENCE OF STRONG ADJACENT SYSTEMS

(71) Applicant: Apple Inc., Cupertino, CA (US)

(72) Inventors: Zhu Ji, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/629,412

(22) Filed: Feb. 23, 2015

(65) Prior Publication Data

US 2015/0173006 A1    Jun. 18, 2015

Related U.S. Application Data

(63) Continuation of application No. 13/938,905, filed on Jul. 10, 2013, now Pat. No. 8,965,365.

(60) Provisional application No. 61/670,574, filed on Jul. 11, 2012.

(51) Int. Cl.
*H04W 4/00* (2009.01)
*H04K 3/00* (2006.01)
*H04W 48/16* (2009.01)

(52) U.S. Cl.
CPC *H04W 48/16* (2013.01); *H04K 3/20* (2013.01)

(58) Field of Classification Search
USPC ........................................ 455/1, 434
See application file for complete search history.

(56) References Cited

U.S. PATENT DOCUMENTS 8,301,075 B2 * 10/2012 Sherman et al. ................... 455/1

* cited by examiner

*Primary Examiner* — Joel Ajayi
(74) *Attorney, Agent, or Firm* — Downey Brand LLP

(57) ABSTRACT

A method for performing a frequency scan in presence of an adjacent jammer signal is provided. The method can include a wireless communication device determining an occurrence of an acquisition (ACQ) failure on a candidate system in a frequency scan candidate list (FSCL) generated based on a first frequency scan; identifying the candidate system as a jammer signal in response to the ACQ failure; suppressing the jammer signal to derive a jammer suppressed signal; and performing a second frequency scan based at least in part on the jammer suppressed signal.

20 Claims, 12 Drawing Sheets

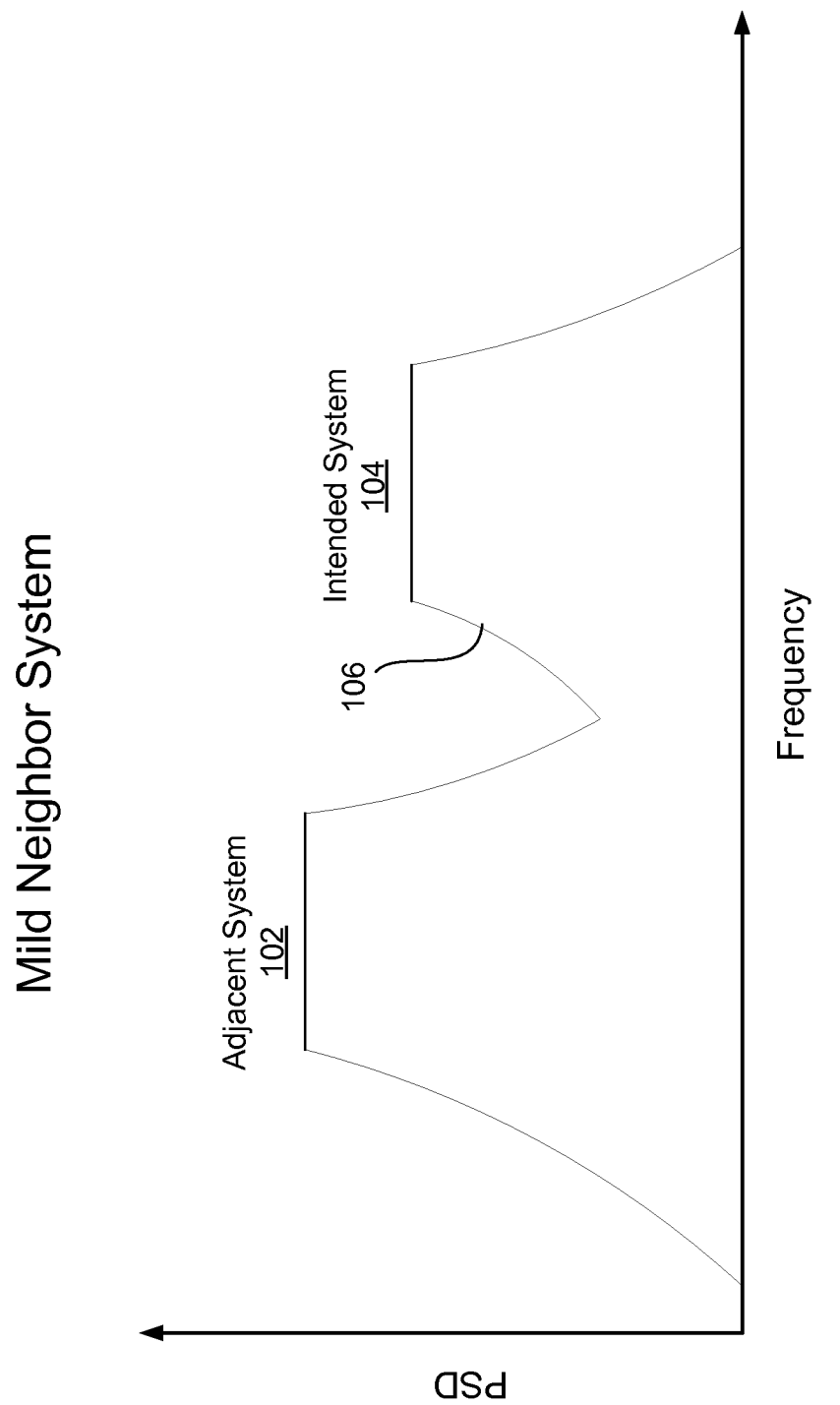

ROBUST FREQUENCY SCAN IN PRESENCE OF STRONG ADJACENT SYSTEMS

CROSS-REFERENCE TO RELATED APPLICATIONS

This application is a continuation of U.S. patent application Ser. No. 13/938,905, filed on Jul. 10, 2013, and entitled, "ROBUST FREQUENCY SCAN IN PRESENCE OF STRONG ADJACENT SYSTEMS", which claims the benefit of U.S. Provisional Patent Application No. 61/670,574, filed on Jul. 11, 2012, and entitled "ROBUST FREQUENCY SCAN IN THE PRESENCE OF STRONG ADJACENT SYSTEMS", each of which are herein incorporated by reference in their entirety for all purposes.

FIELD

The described embodiments relate generally to wireless communications technology, and more particularly to performance of a frequency scan in a wireless communication system.

BACKGROUND

A wireless communication device can connect to wireless system, such as a cellular network, wireless local area network (WLAN), and/or other wireless system, using any number of available frequency bands. In particular, a set of frequency bands can be provided for a particular wireless system. In order for the wireless communication device to connect to a proper wireless network, the exact frequency and associated carrier frequencies that are available for use by the wireless communication device within the wireless network must be known. However, in some situations, this information may not be available to the wireless communication device. In such situations, the wireless communication device can determine the carrier frequencies that are available on a wireless network by using a frequency scanning process attendant to performance of an acquisition (ACQ) process. In this regard, the wireless communication device can scan through possible frequency bands associated with a particular radio access technology (RAT). For example, a wireless communication device configured to access a long term evolution (LTE) wireless network can scan for those carrier frequencies associated with LTE when performing an LTE ACQ process. However, for LTE networks, the available carrier frequency bands can be different for Frequency Division Duplex (FDD) and Time Division Duplex (TDD) systems, and the carrier frequency bands which may be scanned can vary depending on the type of LTE system that is deployed. If the wireless communication device has no prior knowledge or acquisition information, then the wireless communication device can perform what is referred to as a Full Frequency Scan (FFS), whereas if the wireless communication device has had a prior successful acquisition, then carrier frequency information known from the prior acquisition can be used by the wireless communication device to perform a List Frequency Scan (LFS), which can be restricted to a known list of candidate systems. Using a LFS can reduce an amount of time and effort used to find a carrier frequency on which to camp, as the wireless communication device has a list of carrier frequencies that can be immediately searched without performing a full frequency scan within a frequency band.

Unfortunately, however, in some instances, such as in an environments (e.g., urban environments) having a number of different carriers and/or RATs, there can be carrier frequencies having a bandwidth (BW) and center frequency ($F_c$) that can mask, at least to some degree, the carrier frequencies sought out by the wireless communication device during system acquisition. In such instances, these "jammer" frequencies can interfere with the ACQ process of the wireless communication device to the point where the wireless communication device cannot determine an appropriate carrier frequency on which to camp, resulting in a substandard user experience.

SUMMARY

Some embodiments disclosed herein provide improvements in frequency scanning in presence of a strong adjacent system. More particularly, some example embodiments provide a method, apparatus, and computer program product for identifying and suppressing jammer signals to enable a wireless communication device to successfully identify and perform acquisition on an intended candidate system, even in the presence of a jammer signal (e.g., a strong adjacent system) that can otherwise mask or otherwise prevent identification of the intended candidate system due to adjacent channel leakage from the jammer system leaking into the bandwidth of the intended candidate system. As such, some example embodiments enable a wireless communication device to more efficiently identify an available carrier frequency for a desired system, even in the presence of a jammer signal, thus providing for more frequent successful detection and acquisition of available candidate systems and improving user experience.

In a first embodiment, a method for performing a frequency scan in presence of an adjacent jammer signal is provided. The method of the first embodiment can include a wireless communication device determining an occurrence of an acquisition (ACQ) failure on a candidate system in a frequency scan candidate list (FSCL) generated based at least in part on a first frequency scan; identifying the candidate system as a jammer signal in response to the ACQ failure; suppressing the jammer signal to derive a jammer suppressed signal; and performing a second frequency scan based at least in part on the jammer suppressed signal.

In a second embodiment, a wireless communication device is provided. The wireless communication device of the second embodiment can include a transceiver and processing circuitry coupled to the transceiver. The transceiver can be configured to transmit data to and receive data from a wireless network. The processing circuitry can be configured to control the wireless communication device of the second embodiment to at least determine an occurrence of an ACQ failure on a candidate system in an FSCL generated based at least in part on a first frequency scan; identify the candidate system as a jammer signal in response to the ACQ failure; suppress the jammer signal to derive a jammer suppressed signal; and perform a second frequency scan based at least in part on the jammer suppressed signal.

In a third embodiment, a computer program product is provided. The computer program product of the third embodiment can include at least one non-transitory computer readable storage medium having program code stored thereon. The program code of the third embodiment can include program code for determining an occurrence of an ACQ failure on a candidate system in an FSCL generated based at least in part on a first frequency scan; program code for identifying the candidate system as a jammer signal in response to the ACQ failure; program code for suppressing the jammer signal to derive a jammer suppressed signal; and program code for performing a second frequency scan based at least in part on the jammer suppressed signal.

In a fourth embodiment, an apparatus is provided. The apparatus of the fourth embodiment can include means for determining an occurrence of an ACQ failure on a candidate system in an FSCL generated based at least in part on a first frequency scan; means for identifying the candidate system as a jammer signal in response to the ACQ failure; means for suppressing the jammer signal to derive a jammer suppressed signal; and means for performing a second frequency scan based at least in part on the jammer suppressed signal.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIGS. 1A and 1B illustrate examples of interference from adjacent jammer signals that can be addressed by some example embodiments.

DETAILED DESCRIPTION

Figure 1B:
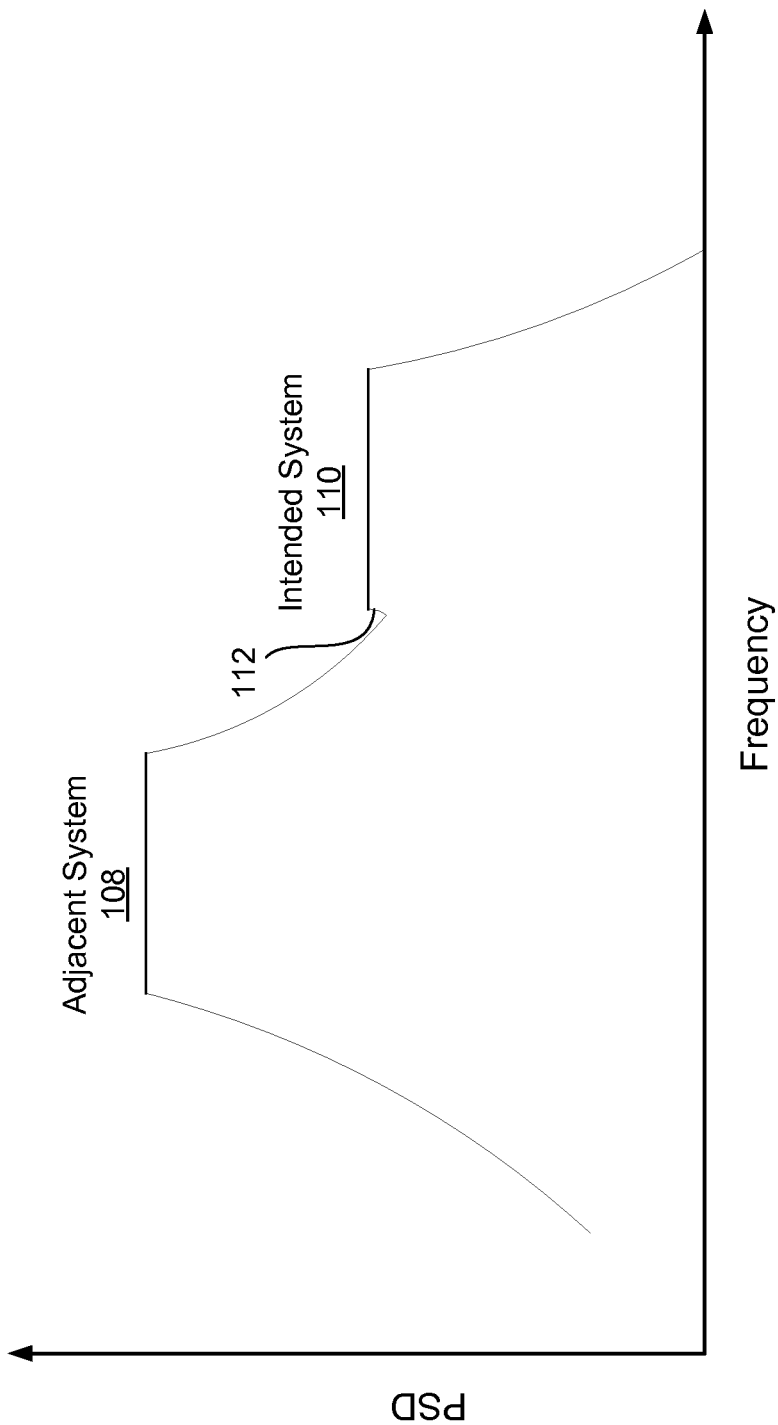

A wireless communication device can be capable of communicating with wireless networks using one or more RATs. For example, a wireless communication device can be configured to communicate with cellular networks using LTE and/or other cellular RAT. As another example, a wireless communication device can be configured to communicate with WLANs, such as can use an Institute of Electrical and Electronics Engineers (IEEE) 802.11 RAT. A wireless communication device can connect to, or camp on, a wireless network, such as, by way of non-limiting example, an LTE network. However, before connecting to a desired wireless network (e.g., an intended system), the wireless communication device must be able to determine a suitable carrier frequency on which to camp. In some situations, such as in urban areas, there can be other wireless systems operating on adjacent channels within the same band as an intended system and/or in a band adjacent to the band of the intended system. For example, an intended system using an intended, higher priority RAT, such as LTE, can be deployed in an area overlapping with a system(s) using an alternative, lower priority RAT(s), such as a Universal Mobile Telecommunication System (UMTS), RAT, Global System for Mobile Communications (GSM), and/or other RAT. As another example, an intended system which a wireless communication device can be trying to acquire can be a public land mobile network (PLMN) operated by a primary network service carrier for the device, but can be deployed in an area with a PLMN(s) operated by a different carrier(s). In such situation in which a wireless system is operating on an adjacent channel to an intended system, one or more carrier frequencies of the intended system can be masked such that the wireless communication device may not be able to identify and acquire a carrier frequency for the intended system.

The ability of a device to distinguish between a frequency of an intended system and an adjacent signal can be defined in terms of Adjacent Channel Selectivity (ACS). For example, ACS can be used to measure a receiver's ability to receive an Evolved Universal Terrestrial Radio Access (E-UTRA) signal at its assigned channel frequency in the presence of an adjacent channel signal at a given frequency offset from the center frequency of the assigned channel. More particularly, ACS can be defined as the ratio of the receive filter attenuation on the assigned channel to the receive filter attenuation on the adjacent channel(s). For example, ACS can be defined as follows:

| Receiver (Rx) Parameter | Units | Channel Bandwidth | | | | | |
|---|---|---|---|---|---|---|---|
| | | 1.4 MHz | 3 MHz | 5 MHz | 10 MHz | 15 MHz | 20 MHz |
| ACS | dB | 33.0 | 33.0 | 33.0 | 33.0 | 30 | 27 |

As noted, strong adjacent systems can impact the detection and acquisition of an intended system. Adjacent systems using different technologies from an intended system can differ in terms of their physical layer signal characteristics form an intended system. Even if an adjacent system uses the same RAT as the intended system, such as in the case of co-deployed LTE systems operated by different carriers, the systems may not be fully time and frequency synchronized. Accordingly, spectrum emission and channel leakage from adjacent systems can impact the detection and acquisition of an intended system, particularly in the case of strong adjacent systems, in which the spectrum emission and channel leakage can be non-negligible to the intended serving system and may cause significant interference to the intended serving system.

Suitable carrier frequencies of a system can be identified using pattern recognition techniques. For example, the wireless communication device can use band edge detection and in-band flatness characteristics to identify a suitable carrier frequency. However, in situations in which strong adjacent systems exist, the spectrum emission and channel leakage from the strong adjacent system can be non-negligible and cause significant interference with the intended system. In those situations, the interference can mask the pattern presented by the intended system to the point where using standard pattern recognition would be fruitless.

FIGS. 1A and 1B illustrate examples of interference from adjacent jammer signals that can mask a signal pattern of an intended system, which can be addressed by some example embodiments. The plots of FIGS. 1A and 1B each illustrate a carrier frequency of an intended system and a carrier frequency of an adjacent system with the power spectral density (PSD) of the systems plotted on the y-axis and frequency plotted on the x-axis. Referring first to FIG. 1A, an example of interference from a mild neighbor system is illustrated. In this regard, channel leakage from the adjacent system 102 can leak into the carrier frequency of the intended system 104, and can impact detection and acquisition of the intended system 104. However, in the example of FIG. 1A, the leakage may not be so significant that it overwhelms the intended system 104 and prevents detection of the band edge 106 of the intended system 104. As such, while the adjacent system 102 can be a jammer signal to the intended system 104 that can be suppressed in accordance with some example embodiments as described further below, in some example embodiments, in instances in which a wireless communication device is still able to detect and acquire the intended system 104, such as if the device has sufficient ACS to detect the intended system 104, suppression of the adjacent system 102 may be omitted. In contrast, FIG. 1B illustrates example impact of interference from a strong neighbor system. In the example of FIG. 1B, leakage from the adjacent system 108 can completely overshadow the intended system 110 such that the band edge 112 of the intended system 110 may not be detectable. As a result, the intended system 110 may not have the signal pattern to be detected in a frequency scan through techniques such as band-edge detection.

Some example embodiments disclosed herein provide for more robust frequency scan and facilitate detection and acquisition of an intended system even in the presence of a strong adjacent system that can mask a carrier frequency of the intended system, such as in the example of FIG. 1B. More particularly, some example embodiments provide for adaptive scanning that can significantly improve the detectability of intended wireless systems by suppressing unwanted jammer signals during the frequency scan. For example, in accordance with some embodiments, an undesired jammer signal in a frequency scan candidate list (FSCL) can be detected and suppressed by a wireless communication device during a frequency scan procedure. In this way, the masking of the desired carrier frequency of an intended system can be substantially reduced to the point where the intended system can be better detected and acquired. Accordingly, a rate of successful detection and acquisition of an intended or otherwise preferred system can be improved, providing for an improved user experience.

Figure 2:
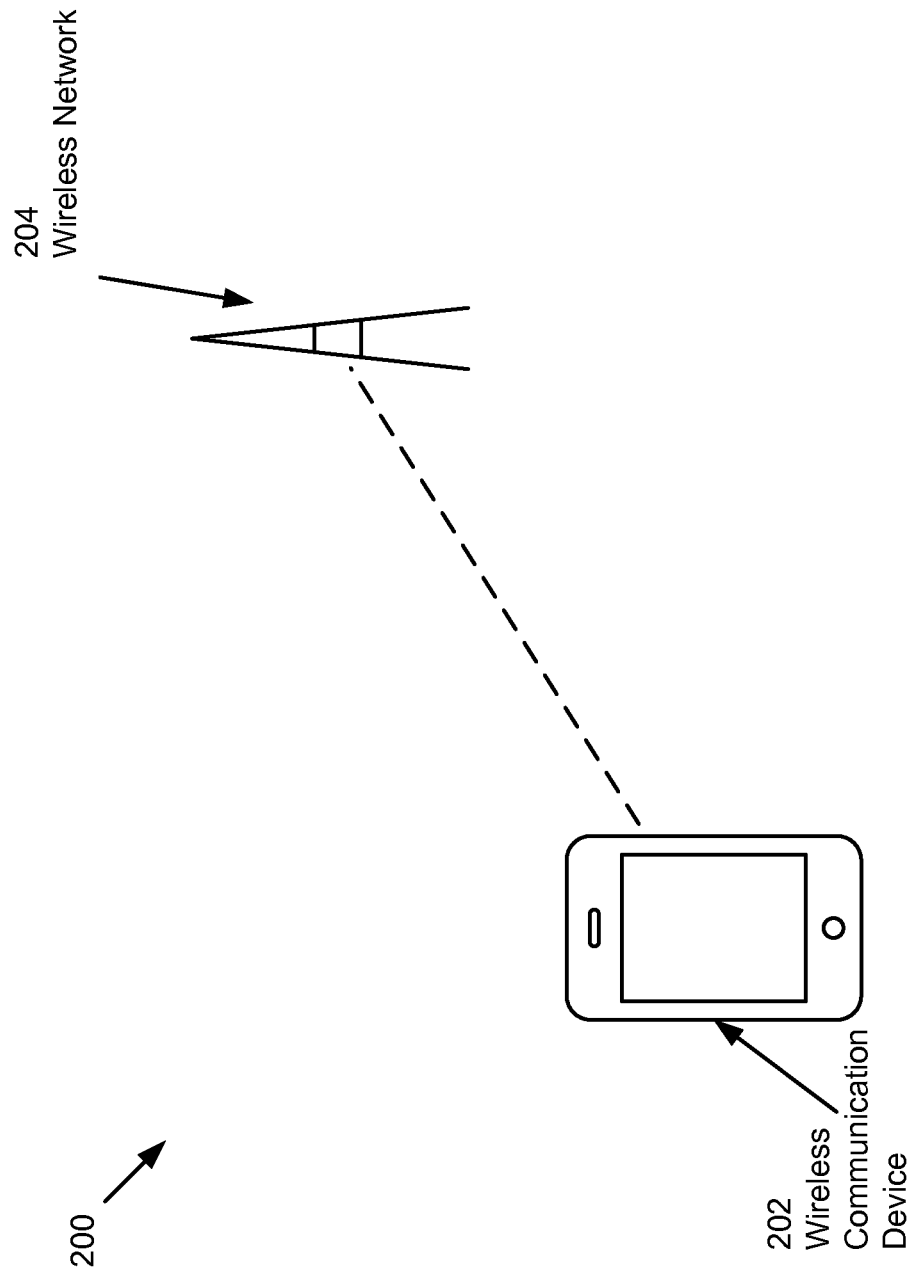
FIG. 2 illustrates a wireless communication system in accordance with some example embodiments.

FIG. 2 illustrates a wireless communication system 200 in accordance with some example embodiments. The system 200 can include a wireless communication device 202. By way of non-limiting example, the wireless communication device 202 can be a cellular phone, such as a smart phone device, a tablet computing device, a laptop computing device, or other computing device configured to support communication via one or more RATs. For example, the wireless communication device 202 can be configured to support communication via one or more cellular RATs, such as LTE, LTE-Advanced (LTE-A), UMTS, Code Division Multiple Access 2000 (CDMA2000), Time Division Synchronous Code Division Multiple Access (TD-SCDMA), Wideband Code Division Multiple Access (WCDMA), GSM, and/or other present or future developed cellular RAT. Additionally or alternatively, the wireless communication device 202 can be configured to support communication via one or more non-cellular RATs, such as, by way of non-limiting example a WLAN RAT, such as can use an IEEE 802.11 standard. In some example embodiments, such as some embodiments in which supports LTE, can be referred to as User Equipment (UE).

The wireless communication device 202 can be located within an area of deployment of one or more wireless networks, such as wireless network 204. The wireless network 204 can use any RAT. For example, the wireless network 204 can implement a cellular RAT, such as LTE, LTE-A, UMTS, CDMA2000, TD-SCDMA, WCDMA, GSM, and/or other present or future developed cellular RAT. As another example, the wireless network 204 can implement a WLAN RAT. In this regard, the wireless network 204 can implement any RAT that can use one or more carrier frequencies to enable network connection by a wireless communication device, such as wireless communication device 202. As such, wireless communication device 202 can connect to wireless network 204 through connection to a carrier frequency that can be used by the wireless network 204. In this regard, the wireless communication device 202 can be configured to perform a frequency scan to identify an available carrier frequency(ies) to connect to the wireless network 204. In some instances, one or more adjacent systems (e.g., other wireless networks) can act as jammer signals, which can interfere with detection and acquisition of a carrier frequency of the wireless network 204. As disclosed herein, the wireless communication device 202 of some example embodiments can be configured to identify and suppress such jammer signals in order to improve system detection and acquisition when performing a frequency scan.

Figure 3:
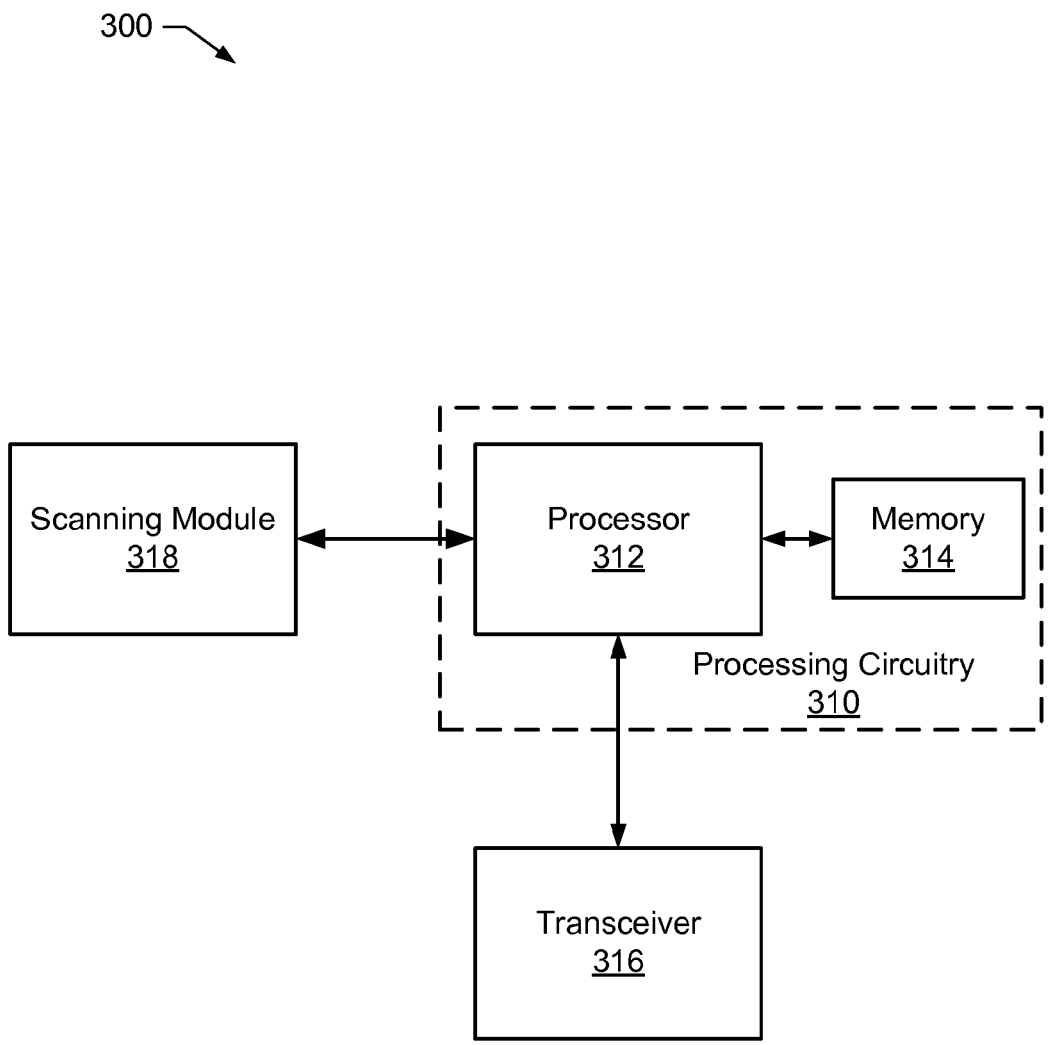
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300, including one or more functionalities of wireless communication device 202, in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to connect to and operate over the wireless network 204. In accordance with some example embodiments, one or more components of the apparatus 300 can provide a cellular baseband chipset.

In some example embodiments, the processing circuitry 310 can include a processor 312 and, in some embodiments, such as that illustrated in FIG. 3, can further include memory 314. The processing circuitry 310 can be in communication with or otherwise control a transceiver 316 and/or scanning module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 214 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver 316, or scanning module 318 via a bus (or buses) for passing information among components of the apparatus 300.

The apparatus 300 can further include a transceiver 316. The transceiver 316 can be configured to enable the apparatus 300 to send wireless signals to and receive signals from a wireless network, such as wireless network 204. As such, the transceiver 316 can be configured to support any type of RAT that may be implemented by the wireless network 204 and/or otherwise supported by the wireless communication device 202.

The apparatus 300 can further include scanning module 318. The scanning module 318 can be embodied as various means, such as circuitry, hardware, a computer program product comprising a computer readable medium (for example, the memory 314) storing computer readable program instructions that are executable by a processing device (for example, the processor 312), or some combination thereof. The scanning module 318 can be configured to control performance of a frequency scan in accordance with one or more example embodiments. In this regard, for example, the scanning module 318 can be configured to identify and suppress jammer signals in accordance with one or more example embodiments disclosed herein.

Figure 4:
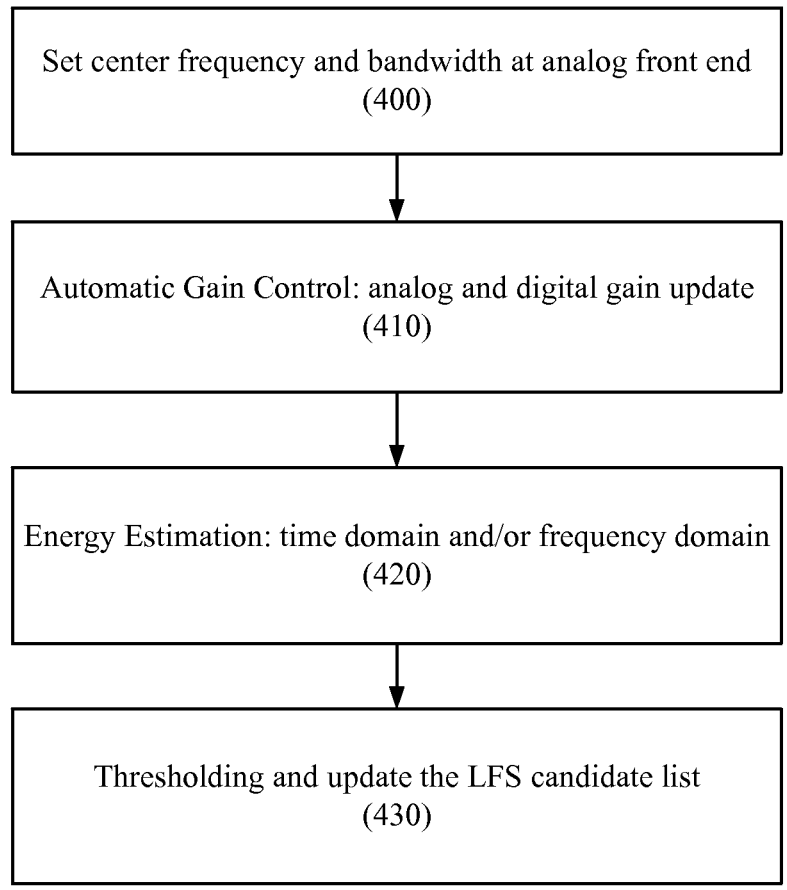
FIG. 4 illustrates a flowchart according to an example method for performing a list frequency scan according to some example embodiments.

In some example embodiments, the scanning module 318 can be configured to control performance of a list frequency scan (LFS) by the wireless communication device 202. An LFS can, for example, be performed in an instance in which a list of carrier frequencies and associated bandwidths (BWs) are available to the wireless communication device 202 based on the device's prior knowledge, such as knowledge that can be obtained from a prior successful frequency scan and system acquisition procedure. FIG. 4 illustrates a flowchart according to an example method for performing an LFS according to some example embodiments. Operation 400 can include setting the center frequency and BW based on prior system knowledge in the analog front end.

Operation 410 can include performing automatic gain control (AGC), including analog and/or digital gain update. In this regard, operation 410 can include setting a low-noise amplifier (LNA) at a default state. Operation 410 can further include collecting baseband samples and estimating the energy. The LNA can be updated to a proper state based on the energy estimation. The digital gain can be updated based on the selected LNA and energy estimation.

Operation 420 can include performing energy estimation based on the updated analog and digital gains that can be set in operation 410. The estimation can be performed in the time domain (e.g., filtering-based estimation) and/or in the frequency domain (e.g., FFT-based estimation).

Operation 430 can include comparing the energy estimation(s) with the threshold for an eligible system(s) and can update the candidate list for follow-up acquisition (ACQ) procedures. Operation 430 can additionally include determining candidate priorities. Prioritization of candidates can, for example, be based on energy metrics and/or other combined metrics that can reflect the probability of the recognized signal pattern.

The scanning module 318 can additionally or alternatively be configured to control performance of a full frequency scan (FFS) by the wireless communication device 202. An FFS can, for example, be performed in instances in which the wireless communication device 202 does not have any applicable prior systems knowledge. In this regard, an FFS can be used to identify possible existing systems for an entire band and/or for all possible bands. Performance of an FFS can include computing the set of center frequencies ($F_c$) and BWs based on possibly deployed band information. AGC adjustments can be made for each respective $F_c$ and BW combination, similarly to operation 410 in an LFS procedure. Additionally, frequency domain energy estimation can be performed for each respective $F_c$ and BW combination based on the updated analog and digital gains, similarly to operation 420 in an LFS procedure. Candidate set generation can be performed based on pattern recognition of the energy estimation, which can manifest possible signals from an available system(s) for the wireless communication device 202. In this regard, band-edge and/or in-band flatness detection techniques can be used to identify potential candidates. For example, if edge detection identifies a possible carrier frequency band and the associated in-band flatness is determined to be within an acceptable threshold variation, then the center frequency of the frequency band can be associated with a suitable carrier frequency and can be identified as a candidate system.

The scanning module 318 of some example embodiments can be configured to identify a jammer signal in a frequency scan candidate list (FSCL) that can be generated based on a frequency scan, such as an LFS and/or FFS, as described above. For example, in some example embodiments, the scanning module 318 can be configured to distinguish a jammer signal from a suitable carrier frequency of an intended system by using the pattern recognition techniques. As such, a strong adjacent system, such as in the example of FIG. 1B can be identified as a jammer signal in those situations where the strong adjacent system masks or otherwise renders the identification of the intended system difficult or impossible.

The scanning module 318 can be configured to use any of a variety of techniques to identify a jammer signal in accordance with various example embodiments. In some example embodiments, a detected candidate j can be identified as a jammer signal in response to an ACQ process failure on the candidate during a frequency scan, such as an FFS. The ACQ failure can, for example, be a search failure (e.g., PSS/SSS detection), a Physical Broadcast Channel (PBC) decoding failure (e.g., a master information block (MIB) decoding failure, system information block (SIB) decoding failure, and/or the like), a PLMN mismatch indicating that the candidate is not the intended system or primary system, and/or other form of ACQ failure. In some example embodiments, the scanning module 318 can be configured to identify a candidate j on which an ACQ failure has occurred as a jammer signal in an instance in which one or more further criteria is satisfied. For example, in some example embodiments, an unwanted system (e.g., candidate j) on which an ACQ failure has occurred can be identified as a jammer signal if it has a higher priority in the FSCL (e.g., has high energy relative to other candidates) than a priority threshold, $\theta_{pri}$. As a further example, in some example embodiments, an unwanted system (e.g., candidate j) on which an ACQ failure has occurred can be identified as a jammer signal if it contributes to a significant part of the overall power in the frequency domain (e.g., more than a threshold portion of the overall power in the frequency domain). For example, in some example embodiments, if the PSD of a potential jammer signal is stronger than the second highest priority candidate system in the FSCL by more than a predefined power level threshold, $\theta_{pwr}$ dB, the potential jammer signal can be considered to contribute to a significant part of the overall power in the frequency domain, and can be identified as a jammer signal. Additionally or alternatively, in some example embodiments, if the PSD of the potential jammer signal is stronger than the average PSD of candidate systems in the FSCL by more than a predefined power level threshold, $\theta_{avg}$ dB, the potential jammer signal can be considered to contribute to a significant part of the overall power in the frequency domain, and can be identified as a jammer signal. It will be appreciated, however, that in an instance in which a detected candidate system has been determined to not be the intended or primary system (e.g., condition the ACQ fails), any of the above described approaches can be used singly or in any suitable combination to identify the system as a jammer signal.

The scanning module 318 can be further configured to suppress an identified jammer signal. For example, in cases in which a jammer signal is a strong adjacent neighbor that is so strong as to completely overwhelm the intended system, the jammer signal can be suppressed so as to unmask the intended system, thereby providing a more robust frequency scan. In this regard, the masking of a carrier frequency of an intended system can be substantially reduced through suppression of a jammer signal(s) to the point where the carrier frequency of the intended system can be identified and used by the wireless communication device for camping on the intended system.

A jammer signal(s) can be suppressed using any number of suitable techniques in accordance with various example embodiments. For example, in some embodiments, a notch filter can be used to suppress an identified jammer signal. Additionally or alternatively, in some example embodiments, a jammer signal can be suppressed using programmable filtering techniques. In some example embodiments, a frequency rotator can be applied to rotate a frequency associated with a filter to be within the bandwidth of a jammer signal so that the filter can be applied to suppress the jammer signal.

The robust frequency scan procedure that can be performed by the scanning module 318 in accordance with some example embodiments can be described in terms of the following operations:

Operation 1: Perform frequency scan (e.g., an FFS) and generate an FSCL

Operation 2: Perform ACQ on one or more candidates in the FSCL (e.g., in the order of priorities of the candidates)

Operation 3: Jammer detection—identify the strong jammer signals (e.g., unwanted systems) based at least in part on the ACQ results Operation 4: Jammer suppression—suppress the identified jammer signals Operation 5: Return to operation 1 and perform a new frequency scan based on the jammer-suppressed signal(s). One or more of operations 2-4 can be repeated based on the new frequency scan. In this regard, the procedure can be iteratively repeated based on ACQ results from a frequency scan.

Figure 5:
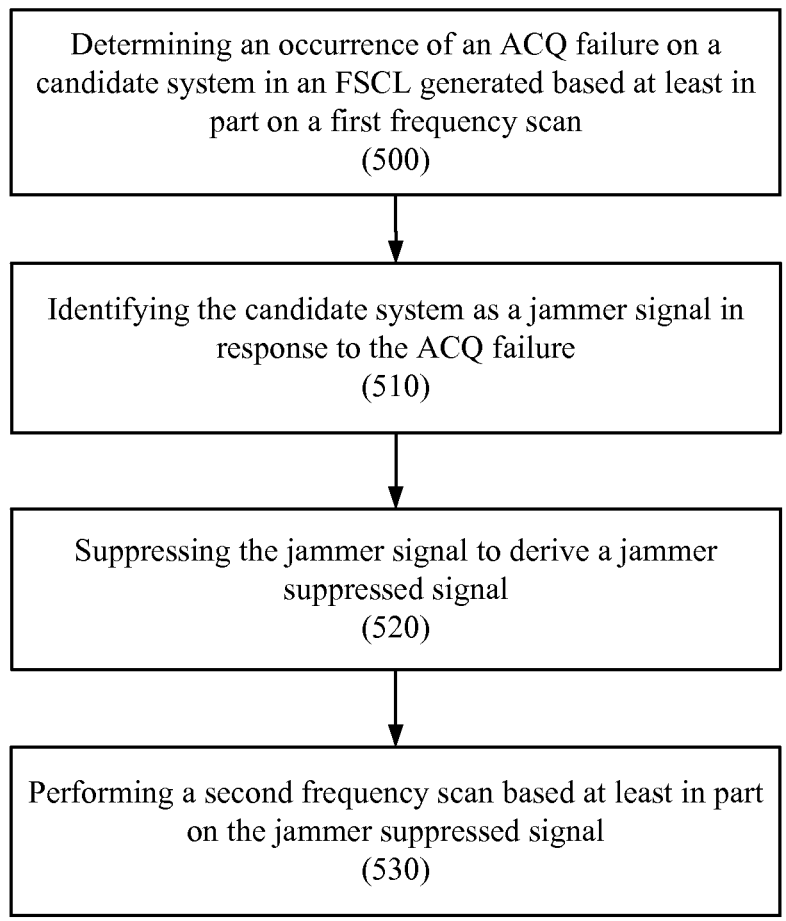
FIG. 5 illustrates a flowchart according to an example method for performing a frequency scan in presence of a jammer signal according to some example embodiments.

FIG. 5 illustrates a flowchart according to an example method for performing a frequency scan in presence of a jammer signal according to some example embodiments. In this regard, FIG. 5 illustrates operations that can be performed by a wireless communication device 202 in accordance with some example embodiments. One or more of processing circuitry 310, processor 312, memory 314, transceiver 316, or scanning module 318 can, for example, provide means for performing one or more of the operations illustrated in and described with respect to FIG. 5.

Operation 500 can include the wireless communication device 202 determining an occurrence of an ACQ failure on a candidate system in an FSCL generated based at least in part on a first frequency scan. The FSCL can be generated based on an FFS and/or an LFS. The ACQ failure can, for example, be a search failure (e.g., PSS/SSS detection), a Physical Broadcast Channel (PBC) decoding failure (e.g., a master information block (MIB) decoding failure, system information block (SIB) decoding failure, and/or the like), a PLMN mismatch indicating that the candidate is not the intended system or primary system, and/or other form of ACQ failure.

Operation 510 can include the wireless communication device 202 identifying the candidate system as a jammer signal in response to the ACQ failure. In some example embodiments, operation 510 can include the wireless communication device 202 determining whether one or more further criteria indicative of the candidate system are satisfied in order to identify the candidate system as a jammer signal. For example, in some embodiments, operation 510 can include identifying the candidate system as a jammer signal in an instance in which the candidate system has a higher priority in the FSCL (e.g., has high energy relative to other candidates) than a priority threshold, $\theta_{pri}$. An example of performance of operation 510 based on the priority of the candidate system in accordance with such example embodiments is illustrated in and described with respect to FIG. 6. As a further example, in some example embodiments, operation 510 can additionally or alternatively include identifying the candidate system as a jammer signal in an instance in which the candidate system contributes to a significant part of the overall power in the frequency domain (e.g., more than a predefined threshold portion of the overall power in the frequency domain). An example of performance of operation 510 based on the contribution of the candidate system to the overall power in the frequency domain is illustrated in and described with respect to FIG. 7.

Operation 520 can include the wireless communication device 202 suppressing the jammer signal to derive a jammer suppressed signal. In this regard, the jammer signal can be suppressed to reduce its spectrum leakage to useful signals from intended candidate systems. Operation 520 can include the wireless communication device 202 applying any appropriate filtering technique and/or algorithm to suppress the detected jammer signal based on its Fc and BW as detected during the frequency scan. Additionally or alternatively, operation 520 can include applying a windowing mechanism before performing an FFT to reduce the leakage from adjacent bands.

In some example embodiments in which operation 520 includes application of a filter to suppress the jammer signal, one or more programmable filters can be applied in an analog front end and/or in a digital receiver front end. The filter coefficients can be programmable to allow different stop bands and/or pass bands. A frequency rotator can be used to align the stop band(s) to desired regions to suppress the jammer signal. The filter can use finite impulse response (FIR) filtering techniques and/or infinite impulse response (IIR) filtering techniques.

Additionally or alternatively, in some example embodiments in which operation 520 includes application of a filter to suppress the jammer signal, one or more notch filters can be applied. In some example embodiments, a notch filter(s) can be used in lieu of a programmable filter to reduce hardware complexity and power consumption. In this regard, a notch filter with a notch(es) at a desired frequency can provide a tradeoff of performance and cost compared to a programmable filter in some example embodiments. It will be appreciated, however, that any combination of programmable filters, notch filters, and/or other appropriate filter type can be applied in accordance with various example embodiments. A notch filter can be used in some example embodiments to suppress a majority of the jammer signal without fully rejecting the jammer signal. In this regard, it can be sufficient in some instances to suppress less than an entirety of the jammer signal in order to unmask the frequency profile an intended candidate system. One or more frequency rotators can be applied as appropriate to rotate a notch frequency associated with a notch filter to an appropriate frequency to suppress the jammer signal (e.g., a frequency within the bandwidth of the jammer signal). In accordance with some example embodiments, a notch filter transfer function can be defined, as follows:

$$H(z) = \frac{1 - z^{-1}}{1 - (1-w)z^{-1}},$$

where w defines the width of the notch.

Operation 530 can include performing a second frequency scan based at least in part on the jammer suppressed signal. In this regard, with the jammer signal suppressed, one or more adjacent intended systems can be revealed and detected. Accordingly, the FSCL can be updated and ACQ can be performed on one or more candidates in the updated FSCL. It will be appreciated that the first and second frequency scans referenced with respect to FIG. 5 are merely described as such to connote an ordering of the frequency scans relative to each other, and not by way of limitation to actually being the first and second frequency scans performed by the device in operation.

Figure 6:
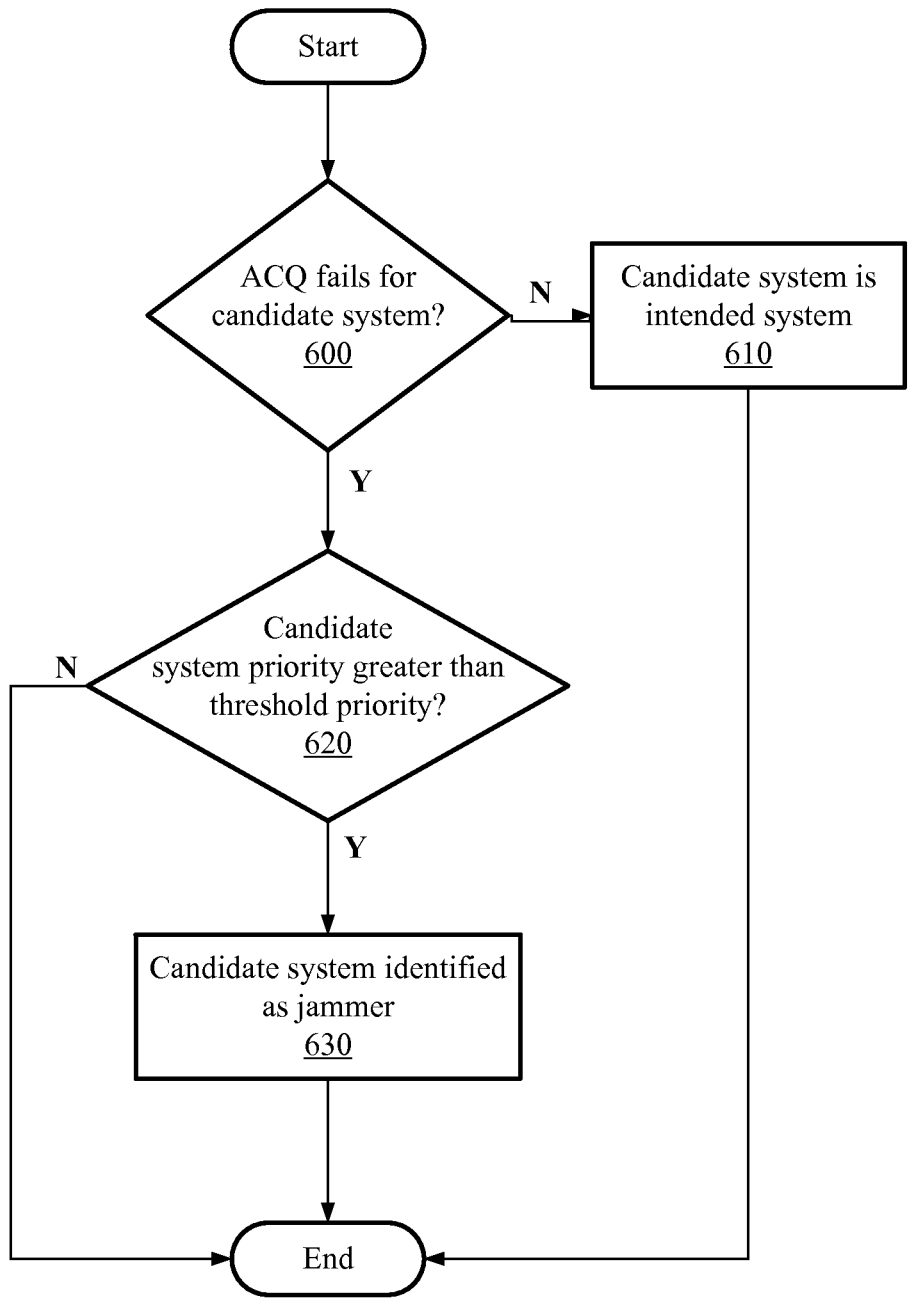
FIG. 6 illustrates a flowchart according to an example method for identifying a candidate system as a jammer signal according to some example embodiments.

FIG. 6 illustrates a flowchart according to an example method for identifying a candidate system as a jammer signal according to some example embodiments. In this regard, FIG. 6 illustrates operations that can be performed by wireless communication device 202 attendant to performance of operation 510 in accordance with some example embodiments. One or more of processing circuitry 310, processor 312, memory 314, transceiver 316, or scanning module 318 can, for example, provide means for performing one or more of the operations illustrated in and described with respect to FIG. 6.

Operation 600 can include determining whether ACQ failed for the candidate system. ACQ failure can occur, for example, for any of the reasons discussed with respect to operation 500 above. If the ACQ has not failed, then the candidate system can be considered an intended system, as illustrated in operation 610, and the method can terminate. If, however, ACQ failed for the candidate system, the method can proceed to operation 620, in which the wireless communication device 202 can determine whether the candidate system has a priority greater than a threshold priority. In this regard candidate systems in the FSCL can be assigned respective priorities, such as based on the respective energies of the candidate systems. If the priority assigned to the candidate system exceeds the threshold priority, the candidate system can be identified as a jammer signal, in operation 630. If, however, the priority assigned to the candidate system does is not greater than the threshold priority, the candidate system may not be identified as a jammer signal, and the method can terminate.

Figure 7:
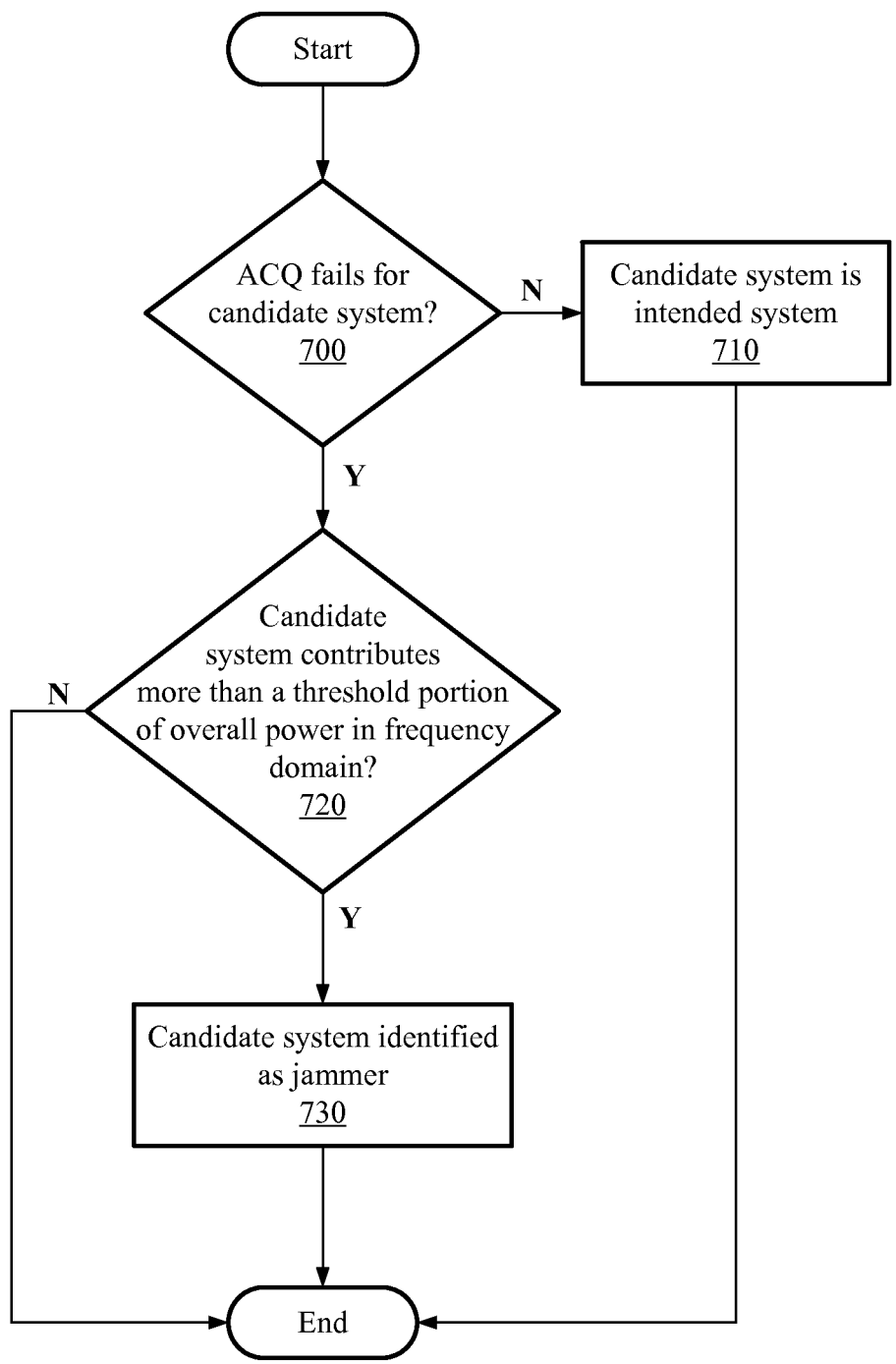
FIG. 7 illustrates a flowchart according to another example method for identifying a candidate system as a jammer signal according to some example embodiments.

FIG. 7 illustrates a flowchart according to another example method for identifying a candidate system as a jammer signal according to some example embodiments. In this regard, FIG. 7 illustrates operations that can be performed by wireless communication device 202 attendant to performance of operation 510 in accordance with some example embodiments. One or more of processing circuitry 310, processor 312, memory 314, transceiver 316, or scanning module 318 can, for example, provide means for performing one or more of the operations illustrated in and described with respect to FIG. 7.

Operation 700 can include determining whether ACQ failed for the candidate system. ACQ failure can occur, for example, for any of the reasons discussed with respect to operation 500 above. If the ACQ has not failed, then the candidate system can be considered an intended system, as illustrated in operation 710, and the method can terminate. If, however, ACQ failed for the candidate system, the method can proceed to operation 720, in which the wireless communication device 202 can determine whether the candidate system contributes more than a threshold portion of overall power in the frequency domain. If the candidate system contributes more than the threshold portion of overall power in the frequency domain, the candidate system can be identified as a jammer signal, in operation 630. If, however, the candidate system does not contribute more than the threshold portion of overall power in the frequency domain, the candidate system may not be identified as a jammer signal, and the method can terminate.

In some example embodiments, the determination of operation 720 can be based on a threshold power level. For example, in some example embodiments, if the PSD of the candidate system is stronger than the second highest priority candidate system in the FSCL by more than a predefined power level threshold, $\theta_{pwr}$ dB, the candidate system can be considered to contribute more than the threshold portion of overall power in the frequency domain, and can be identified as a jammer signal. Additionally or alternatively, in some example embodiments, if the PSD of the candidate system is stronger than the average PSD of candidate systems in the FSCL by more than a predefined power level threshold, $\theta_{avg}$ dB, the candidate system can be considered to contribute more than the threshold portion of overall power in the frequency domain, and can be identified as a jammer signal. In various example embodiments, the thresholds $\theta_{pwr\_dB}$ and $\theta_{avg}$ dB can be applied singly and/or in combination to determine if a candidate system is a jammer signal.

In some example embodiments, performance of operation 510 can include the performance of both operation 620 and operation 720 such that the conditions of both operation 620 and 720 have to be satisfied in order for a candidate system on which an ACQ failure has occurred to be identified as a jammer signal. Alternatively, in some example embodiments, satisfaction of either the condition of operation 620 or the condition of operation 720 can be sufficient to identify a candidate system on which an ACQ failure has occurred as a jammer signal in operation 510. As yet another example, in some embodiments, operation 510 can include performance of one of the method of FIG. 6 or the method of FIG. 7 for determination of whether a candidate system on which an ACQ failure has occurred is a jammer signal.

In some example embodiments, after a jammer signal has been identified, the jammer frequency information can be stored for later use. In this way, the amount of time and effort that can be expended by wireless communication device 202 during an ACQ can be substantially reduced since specific jammer frequencies can be known apriori from previous scans and can be avoided.

Figure 8:
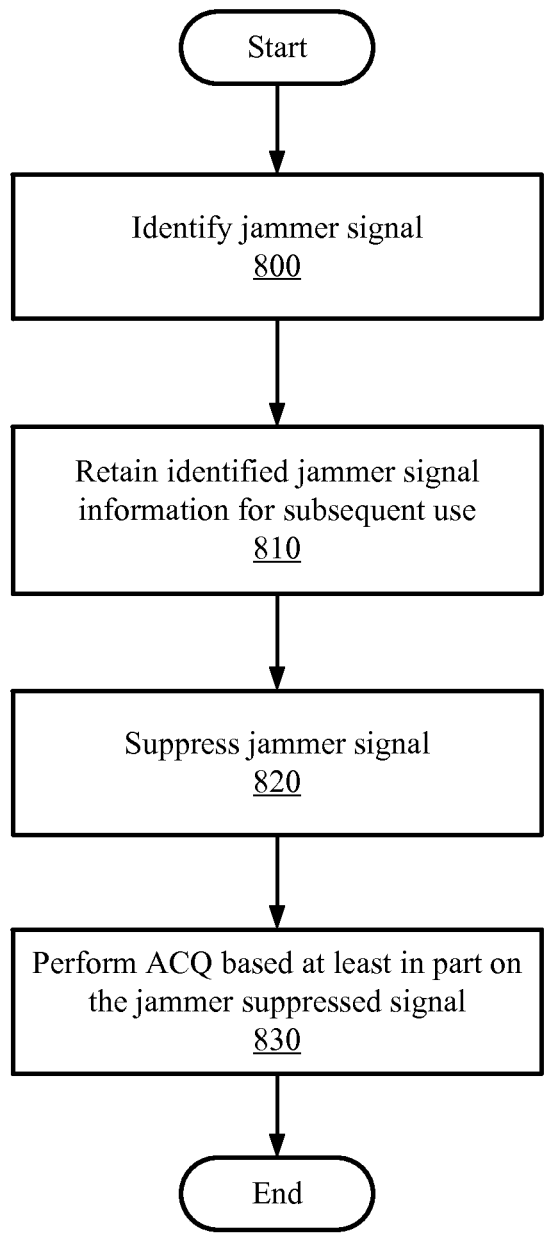
FIG. 8 illustrates a flowchart according to another example method for performing a frequency scan in presence of a jammer signal according to some example embodiments.

FIG. 8 illustrates a flowchart according to another example method for performing a frequency scan in presence of a jammer signal according to some example embodiments in which jammer frequency information for an identified jammer signal can be stored and/or otherwise retained by the wireless communication device 202 for later use. One or more of processing circuitry 310, processor 312, memory 314, transceiver 316, or scanning module 318 can, for example, provide means for performing one or more of the operations illustrated in and described with respect to FIG. 8.

Operation 800 can include the wireless communication device 202 identifying a jammer signal. Operation 810 can include the wireless communication device 202 retaining jammer signal information for subsequent use. Operation 820 can include the wireless communication device 202 suppressing the jammer signal. Operation 830 can include the wireless communication device 202 performing ACQ based at least in part on the jammer suppressed signal.

In some example embodiments, in an instance in which more than one jammer signal has been identified, then the multiple jammer signals can be suppressed. In some such example embodiments in which multiple jammer signals can be suppressed, multiple filters (e.g., programmable and/or notch filters) can be applied to suppress the jammer signals, which can have different BWs and center frequencies. Likewise, multiple frequency rotators can be applied, where appropriate, to rotate the filters to the respective jammer center frequencies. In instances in which two or more jammer signals are adjacent to each other, jammer suppression can be carried out by rotating the frequency to be within the bandwidths of the adjacent jammers, and a single filter having a wider stop band or notch can be applied to suppress the multiple adjacent jammers.

Figure 9:
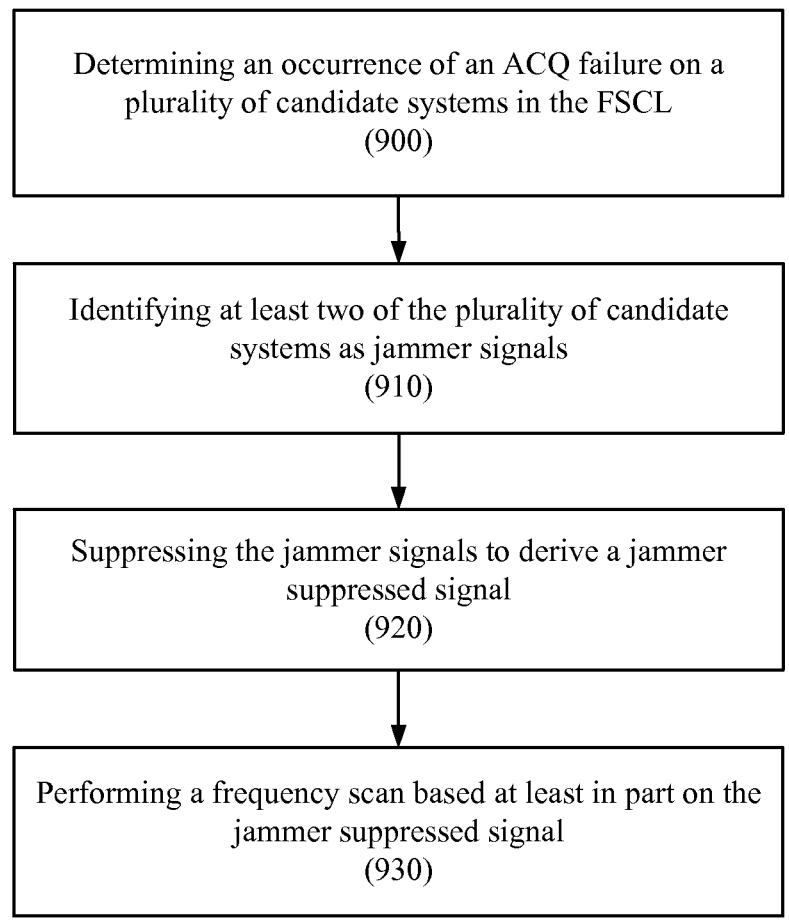
FIG. 9 illustrates a flowchart according to an example method for performing a frequency scan in presence of multiple jammer signals according to some example embodiments.

FIG. 9 illustrates a flowchart according to an example method for performing a frequency scan in presence of multiple jammer signals according to some example embodiments. In this regard, FIG. 9 illustrates operations that can be performed by a wireless communication device 202 in accordance with some example embodiments. One or more of processing circuitry 310, processor 312, memory 314, transceiver 316, or scanning module 318 can, for example, provide means for performing one or more of the operations illustrated in and described with respect to FIG. 9.

Operation 900 can include the wireless communication device 202 determining an occurrence of an ACQ failure on a plurality of candidate systems in an FSCL. Operation 910 can include the wireless communication device 202 identifying at least two of the plurality of candidate systems on which ACQ failure has occurred (e.g., a subset comprised of two or more of the plurality of candidate systems on which ACQ failure has occurred) as jammer signals. Identification of candidate systems on which ACQ failure has occurred as jammer signals can, for example, be performed using any combination of one or more of the techniques described with respect to operation 510.

Operation 920 can include the wireless communication device 202 suppressing the jammer signals to derive a jammer suppressed signal. For example, operation 920 can include applying one or more filters (e.g., one or more notch filters and/or one or more programmable filters) and one or more frequency rotators, as appropriate, for suppressing the jammer signals. In this regard, for example, any of the techniques for suppressing a jammer signal described with respect to operation 520 can be used alone or in combination to suppress the multiple jammer signals.

Operation 930 can include the wireless communication device 202 performing a frequency scan based at least in part on the jammer suppressed signal. In this regard, with the jammer signal suppressed, one or more adjacent intended systems can be revealed and detected. Accordingly, the FSCL can be updated and ACQ can be performed on one or more candidates in the updated FSCL.

In some example embodiments, the scanning module 318 can be configured to apply selective suppression techniques such that a subset of identified jammer signals can be suppressed. For example, in some example embodiments, a determination of whether to suppress a detected jammer signal can be made based at least in part on an extent of impact of the jammer signal on ACQ of an intended candidate system. As a more particular example, in some example embodiments, if the jammer signal is adjacent, or otherwise proximate in frequency, to a current candidate system on which ACQ is being/is to be performed, the jammer signal can be suppressed. Otherwise, suppression of the jammer signal can be omitted in accordance with some such example embodiments.

Figure 10:
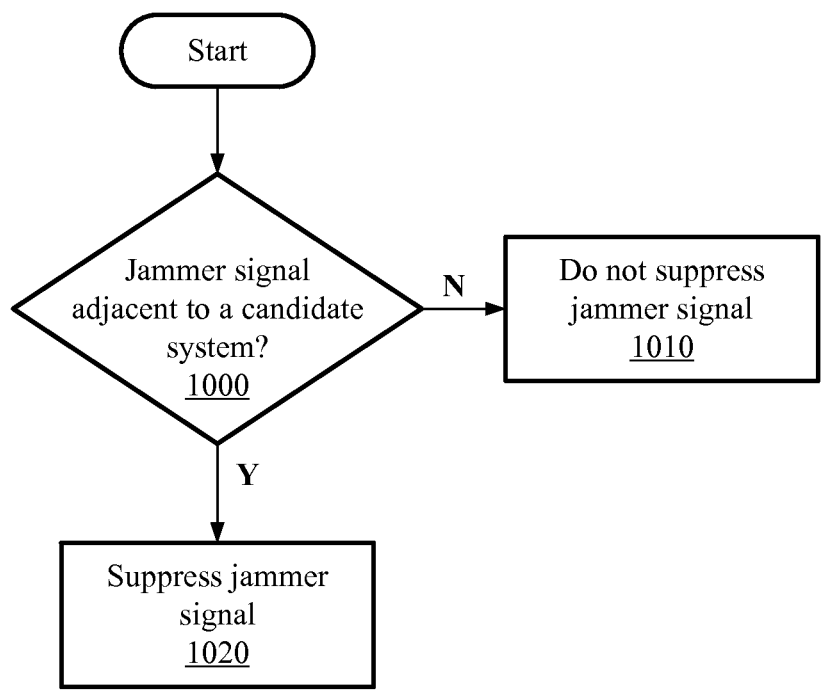
FIG. 10 illustrates a flowchart according to an example method for selective jammer signal suppression according to some example embodiments.

FIG. 10 illustrates a flowchart according to an example method for selective jammer signal suppression according to some example embodiments. In this regard, FIG. 10 illustrates operations that can be performed by a wireless communication device 202 in accordance with some example embodiments. One or more of processing circuitry 310, processor 312, memory 314, transceiver 316, or scanning module 318 can, for example, provide means for performing one or more of the operations illustrated in and described with respect to FIG. 10.

Operation 1000 can include the wireless communication device 202 determining whether a detected jammer signal is adjacent to a candidate system. In some embodiments, the determination of operation 1000 can, for example, include making the determination for any candidate system in the FSCL. As another example, operation 1000 can include determining whether the jammer signal is adjacent to a next highest priority candidate system in the FSCL on which ACQ is being and/or is next to be performed.

In an instance in which it is determined in operation 1000 that the jammer signal is not adjacent to a candidate system, the method can proceed operation 1010, in which it can be determined to not suppress the jammer signal. If, however, it is determined in operation 1000 that the jammer signal is adjacent to a candidate system, the method can instead proceed to operation 1020 and the jammer signal can be suppressed. Any of the techniques described with respect to operation 520 can, for example, be used to suppress the jammer signal in operation 1020.

In some example embodiments, awareness of a jammer signal can be used to modify parameters that can be applied for system detection and acquisition in a frequency scan. In this regard, if existence of a jammer signal is known, spectral leakage can be expected and the impact to adjacent bands can be estimated. As such, given a detected jammer signal(s), rules for candidate generation during frequency scan can be modified to be jammer-aware in accordance with some example embodiments. For example, a relaxed pattern detection threshold(s) can be defined and can be applied when using pattern detection to identify potential candidate systems during a frequency scan. For example, in the presence of an adjacent jammer signal, the signal energy jump and/or dip at a band edge of a candidate system may not be as steep as would otherwise be the case in a non jammer scenario (e.g., as illustrated in the examples of FIG. 1A and FIG. 1B). Accordingly, a threshold for band-edge detection can be relaxed such that a threshold energy slope that can be applied to detect a band-edge can be reduced in the presence of a jammer signal. Additionally or alternatively, in the presence of adjacent jammer signal, the in-band flatness of an intended system adjacent to a jammer signal can be biased to be higher when close to the jammer signal. As such, in some example embodiments, in-band flatness criteria that can be applied for pattern detection of a candidate system can be relaxed to allow for extra in-band fluctuation in the presence of an adjacent jammer signal.

Figure 11:
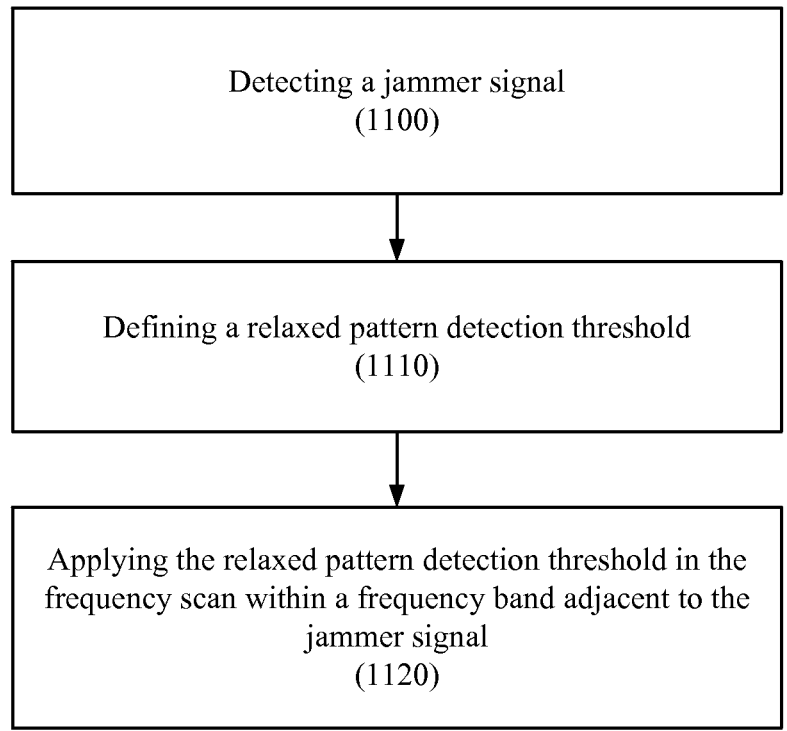
FIG. 11 illustrates a flowchart according to an example method for jammer-aware frequency scan according to some example embodiments.

FIG. 11 illustrates a flowchart according to an example method for jammer-aware frequency scan according to some example embodiments. In this regard, FIG. 11 illustrates operations that can be performed by a wireless communication device 202 in accordance with some example embodiments. One or more of processing circuitry 310, processor 312, memory 314, transceiver 316, or scanning module 318 can, for example, provide means for performing one or more of the operations illustrated in and described with respect to FIG. 11.

Operation 1100 can include the wireless communication device 202 detecting a jammer signal. Operation 1110 can include the wireless communication device 202 defining a relaxed pattern detection threshold for applying for candidate detection within proximity of the jammer signal during the frequency scan. The relaxed pattern detection threshold can, for example, include a relaxed threshold energy slope that can be applied to detect a band-edge, a relaxed in-band flatness threshold, and/or other pattern detection threshold that can be modified to facilitate candidate detection in the presence of spectral leakage from a known adjacent jammer signal. Operation 1120 can include the wireless communication device 202 applying the relaxed pattern detection threshold in the frequency scan within a frequency band adjacent to the jammer signal. In this regard, operation 1120 can include applying the relaxed pattern detection threshold within a portion of the frequency spectrum that can be affected by spectral leakage from the known jammer signal when generating a candidate set. In accordance with some example embodiments, the process illustrated in FIG. 11 can be performed within a single frequency scan without suppressing the jammer signal rather than suppressing the jammer signal and iteratively performing a follow-up frequency scan based on the jammer suppressed signal.

It will be appreciated that the techniques for performing a frequency scan in the presence of jammer signals disclosed herein can be applied to any RAT. As such, where example techniques are described with respect to a specific RAT, such as LTE and/or other cellular RAT, it will be appreciated that those techniques can be applied mutatis mutandis to any RAT within the scope of the disclosure.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for performing a jammer-aware frequency scan in presence of an adjacent jammer signal, the method comprising:
at a wireless communication device:
obtaining jammer information for one or more jammer signals; and
performing an acquisition (ACQ) procedure for a candidate system at a carrier frequency in a frequency scan candidate list (FSCL),
wherein at least a portion of the jammer information is derived from one or more previous ACQ procedures performed by the wireless communication device, and
wherein the wireless communication device performs the ACQ procedure for the candidate system by using a modified detection threshold for detection of the candidate system when the candidate system uses bandwidth proximate to at least one of the one or more jammer signals.

2. The method of claim 1, further comprising:
at the wireless communication device:
identifying a jammer signal during a previous ACQ procedure; and
storing jammer information for the identified jammer signal in storage associated with the wireless communication device,
wherein the wireless communication device obtains the jammer information for the one or more jammer signals at least in part by retrieving stored jammer information from the storage associated with the wireless communication device.

3. The method of claim 2, wherein the wireless communication device identifies the jammer signal during the previous ACQ procedure at least by detecting an occurrence of one or more ACQ failures for one or more carrier frequencies in the FSCL.

4. The method of claim 3,
wherein the FSCL comprises a list of carrier frequencies and associated frequency bandwidths, and
wherein the wireless communication device identifies the jammer signal during the previous ACQ procedure further at least by determining an energy of the jammer signal exceeds an energy threshold.

5. The method of claim 3,
wherein the FSCL comprises a list of carrier frequencies and associated frequency bandwidths, and
wherein the wireless communication device identifies the jammer signal during the previous ACQ procedure further by at least determining the jammer signal contributes more than a power threshold portion of power within the frequency bandwidth associated with the carrier frequency.

6. The method of claim 5, wherein the wireless communication device determines the jammer signal contributes more than the power threshold portion of power within the frequency bandwidth associated with the carrier frequency by:
determining whether a power spectral density (PSD) of the jammer signal exceeds an average PSD for other carrier frequencies in the FSCL.

7. The method of claim 3, wherein the ACQ failure comprises a primary synchronization signal (PSS) detection failure or a secondary synchronization signal (SSS) detection failure.

8. The method of claim 3, wherein the ACQ failure comprises a master information block (MIB) decoding failure or a system information block (SIB) decoding failure.

9. The method of claim 3, wherein the ACQ failure comprises a public land mobile network (PLMN) mismatch that indicates the carrier frequency is not associated with an intended system or a primary system for the wireless communication device.

10. The method of claim 1, wherein the modified detection threshold for the candidate system comprises a relaxed energy slope threshold applicable for detection of a band-edge in presence of spectral leakage of the at least one of the one or more jammer signals.

11. The method of claim 1, wherein the modified detection threshold for the candidate system comprises a relaxed pattern detection threshold applicable for detection of the candidate system in presence of spectral leakage of the at least one of the one or more jammer signals.

12. The method of claim 11, further comprising:
applying the relaxed pattern detection threshold within a frequency band adjacent to the at least one of the one or more jammer signals.

13. The method of claim 11, further comprising:
applying the relaxed pattern detection threshold within a portion of a frequency spectrum affected by spectral leakage from the at least one of the one or more jammer signals.

14. The method of claim 1 further comprising:
generating the FSCL based at least in part on the one or more previous ACQ procedures performed by the wireless communication device, wherein each of a plurality of candidate systems in the FSCL is assigned a respective priority;
determining an occurrence of an ACQ failure for a candidate system in the FSCL; and
identifying the candidate system in the FSCL as a jammer signal when an assigned priority assigned to the candidate system exceeds a priority threshold.

15. The method of claim 1 further comprising:
generating at least one jammer suppressed signal based on the obtained jammer information,
wherein the wireless communication device performs the ACQ procedure for the candidate system using the generated at least one jammer suppressed signal.

16. A wireless communication device comprising:
a transceiver configured to transmit data to and receive data from a wireless network; and
processing circuitry coupled to the transceiver and configured to control the wireless communication device to:
obtain jammer information for one or more jammer signals; and perform an acquisition (ACQ) procedure for a candidate system at a carrier frequency in a frequency scan candidate list (FSCL), wherein at least a portion of the jammer information is derived from one or more previous ACQ procedures performed by the wireless communication device, and wherein the wireless communication device performs the ACQ procedure for the candidate system by using a modified detection threshold for detection of the candidate system when the candidate system uses bandwidth proximate to at least one of the one or more jammer signals.

17. The wireless communication device of claim 16, wherein the processing circuitry is further configured to control the wireless communication device to:

identify a jammer signal during a previous ACQ procedure; and store jammer information for the identified jammer signal in storage associated with the wireless communication device, wherein the wireless communication device obtains the jammer information for the one or more jammer signals during the previous ACQ procedure at least in part by detecting an occurrence of an ACQ failure for a carrier frequency in the FSCL.

18. The wireless communication device of claim 17, wherein the FSCL comprises a list of carrier frequencies and associated frequency bandwidths, and wherein the wireless communication device identifies the jammer signal during the previous ACQ procedure further by at least determining the jammer signal contributes more than a power threshold portion of power within the frequency bandwidth associated with the carrier frequency.

19. The wireless communication device of claim 16, wherein the processing circuitry is further configured to control the wireless communication device to:

generate the frequency scan candidate list FSCL based at least in part on the one or more previous ACQ procedures performed by the wireless communication device, wherein each of a plurality of candidate systems in the FSCL is assigned a respective priority;

determine an occurrence of an ACQ failure for a candidate system in the FSCL; and identify the candidate system in the FSCL as a jammer signal when an assigned priority assigned to the candidate system exceeds a priority threshold.

20. A non-transitory computer-readable medium comprising instructions that, when executed by a processor of a wireless communication device, cause the wireless communication device to:

obtain jammer information for one or more jammer signals; and perform an acquisition (ACQ) procedure for a candidate system at a carrier frequency in a frequency scan candidate list (FSCL), wherein at least a portion of the jammer information is derived from one or more previous ACQ procedures performed by the wireless communication device, and wherein the wireless communication device performs the ACQ procedure for the candidate system by using a modified detection threshold for detection of the candidate system when the candidate system uses bandwidth proximate to at least one of the one or more jammer signals.

* * * * *